(12) United States Patent
Makita et al.

(10) Patent No.: US 7,598,633 B2
(45) Date of Patent: Oct. 6, 2009

(54) AC MOTOR DESIGNED TO ENSURE HIGH EFFICIENCY IN OPERATION

(75) Inventors: Shinji Makita, Kakamigahara (JP); Masayuki Nashiki, Komaki (JP)

(73) Assignee: Denso Corporation, Kariya (JP)

( * ) Notice: Subject to any disclaimer, the term of this patent is extended or adjusted under 35 U.S.C. 154(b) by 389 days.

(21) Appl. No.: 11/496,423

(22) Filed: Aug. 1, 2006

(65) Prior Publication Data
US 2007/0024145 A1 Feb. 1, 2007

(30) Foreign Application Priority Data
Aug. 1, 2005 (JP) ............... 2005-222738

(51) Int. Cl.
*H02K 37/14* (2006.01)
*H02K 17/00* (2006.01)
(52) U.S. Cl. ................ 310/49 R; 310/185; 310/257
(58) Field of Classification Search ........... 310/49 R, 310/257, 179, 184, 185
See application file for complete search history.

(56) References Cited

U.S. PATENT DOCUMENTS

| | | | | |
|---|---|---|---|---|
| 6,121,712 A | * | 9/2000 | Sakamoto | 310/254 |
| 6,153,953 A | * | 11/2000 | Isozaki et al. | 310/49 R |
| 6,259,176 B1 | * | 7/2001 | Isozaki et al. | 310/49 R |
| 6,323,569 B1 | * | 11/2001 | Akama | 310/49 R |
| 6,765,321 B2 | * | 7/2004 | Sakamoto | 310/49 R |
| 2002/0190585 A1 | | 12/2002 | Sakamoto | |
| 2005/0012427 A1 | | 1/2005 | Seki et al. | |
| 2005/0099082 A1 | | 5/2005 | Nashiki | |

FOREIGN PATENT DOCUMENTS

| | | |
|---|---|---|
| JP | A 9-261513 | 9/1994 |
| JP | A-2003-009500 | 1/2003 |
| JP | A 2005-20981 | 1/2005 |
| JP | A 2005-160285 | 6/2005 |

* cited by examiner

*Primary Examiner*—Tran N Nguyen
(74) *Attorney, Agent, or Firm*—Oliff & Berridge, PLC

(57) ABSTRACT

An ac motor is provided which includes a plurality of looped windings each of which extends in a circumferential direction of a stator. The stator is equipped with N stator pole groups made up of magnetic poles arranged along a circumference thereof. The looped windings are disposed adjacent each other in an axial direction of the stator. The number P of the rotor magnetic poles and the number M of the magnetic poles of the stator are selected to meet a relation of $M<(P/2)\times N$. This structure permits the number of the magnetic poles of the stator to be decreased, which ensures desired air gaps between the magnetic poles of the stator, thus minimizing a leakage of magnetic flux between the magnetic poles of the stator to increase torque to be outputted by the motor.

5 Claims, 10 Drawing Sheets

FIG. 1
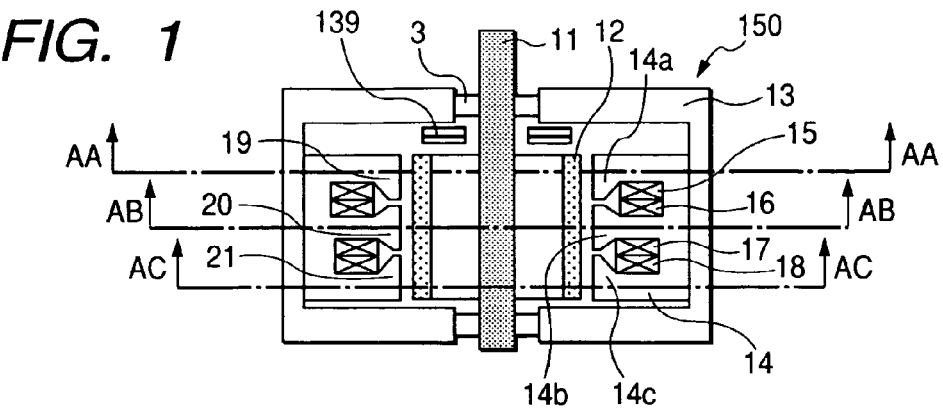
FIG. 2
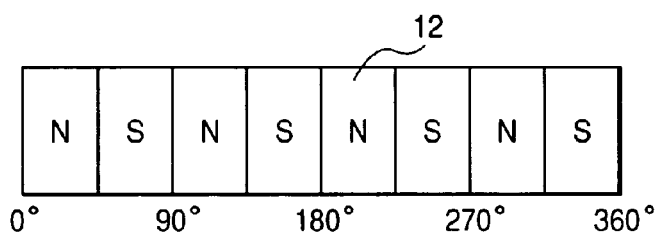
FIG. 3(a)  FIG. 3(b)  FIG. 3(c)
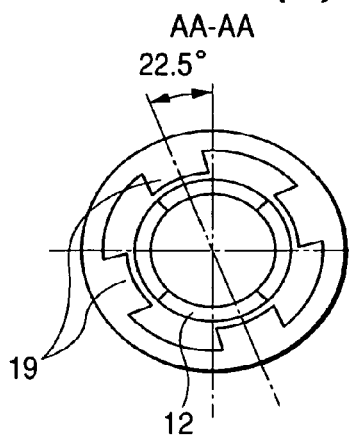 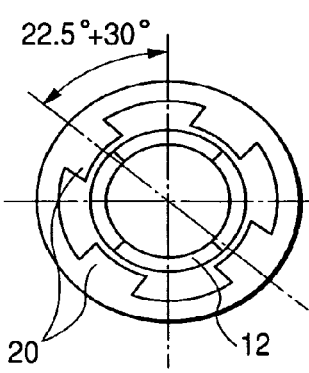 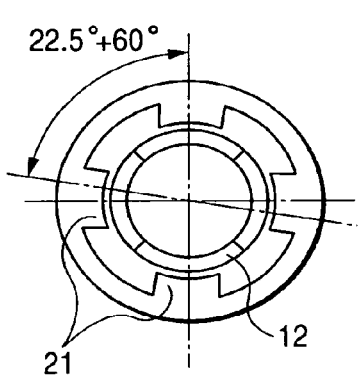
FIG. 4
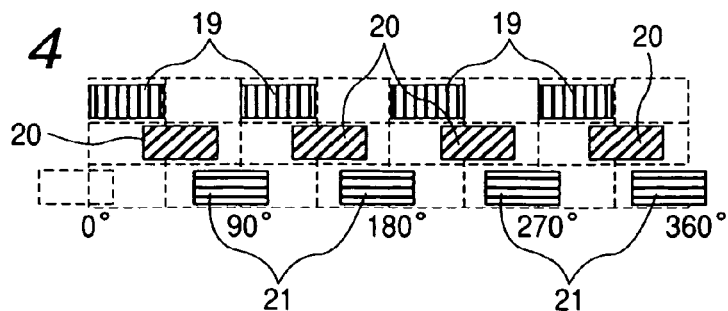

AC MOTOR DESIGNED TO ENSURE HIGH EFFICIENCY IN OPERATION

CROSS REFERENCE TO RELATED DOCUMENT

The present application claims the benefits of Japanese Patent Application No. 2005-222738 filed on Aug. 1, 2005, the disclosure of which is incorporated herein by reference.

BACKGROUND OF THE INVENTION

1. Technical Field of the Invention The present invention relates generally to an ac electric motor for use in passenger automobiles or autotrucks, and more particularly to such a motor designed to ensure high efficiency in operation and to be allowed to be reduced in size and manufactured at low costs.

2. Background Art

Japanese Patent First Publication No. 6-261513 discloses a brushless motor equipped with multiple phase windings each of which wound around a stator magnetic pole in the form of a concentrated winding. This structure encounters the drawback in that each of the windings needs to be placed deep in one of slots between the stator magnetic poles, thus resulting in limited numbers of turns of the windings, and has difficulties in permitting the motor to be reduced in size and produced at low costs and in improving torque-producing efficiency.

In order to alleviate such problems, the inventors of this application have proposed an improved structure of an ac motor in Japanese Patent First Publication No. 2005-160285 that is an equivalent to US2005/0099082 A1 filed Nov. 8, 2004. This will be described below.

The ac motor includes a rotor, a stator, and a plurality of looped windings. The rotor has north and south poles arranged alternately along a circumference thereof. The stator has stator magnetic poles arranged along a circumference thereof. The stator magnetic poles are broken down into N phase pole groups which are located out of alignment in circumferential and axial directions of the stator. The looped windings extend in the circumferential direction of the stator in magnetic relation to the N phase pole groups and are arranged adjacent each other in the axial direction of the stator. Considering an example in which windings wound around the stator magnetic poles of the same group, currents which flow through portions of the windings lying between adjacent two of the stator magnetic poles work to produce magnetomotive forces each of which cancels the other. This is equivalent to when no current flow through the portions of the windings. It is, thus, possible to replace the windings wound around the stator magnetic poles with the looped windings. This means that the portions of the windings lying adjacent two of the stator magnetic poles are omitted, thus permitting the motor to be designed to produce increased torque and the stator magnetic poles to be increased. The structure of the looped windings is simple, thus resulting in improved productivity thereof. The looped windings extend symmetrically with respect to the circumference of the stator, thus resulting in a decrease in deformation of the stator or strain of parts of the motor arising from magnetic attraction, as produced between the rotor and the stator, which leads to reduction in mechanical vibration and noise in the motor.

The inventors of this application has studied the number of the stator magnetic poles and the layout thereof in the above type of ac motor in order to increase output torque, decrease torque ripples, and/or simplify the structure of the motor further.

SUMMARY OF THE INVENTION

It is an object of the invention to provide an improved structure of ac motor which is designed to ensure high efficiency in operation and allowed to be reduced in size and manufactured at low costs.

According to one aspect of the invention, there is provided an ac motor which comprises: (a) a rotor having rotor magnetic poles which are N-poles and S-poles arranged alternately along a circumference thereof; (b) a stator having N stator pole groups made up of magnetic poles arranged along a circumference thereof, the N stator pole groups being shifted in a circumferential direction of the stator relatively from a preselected reference one of the rotor magnetic poles by different angles, respectively, on a pole basis; and (c) a plurality of looped windings each of which extends in a circumferential direction of the stator. The looped windings are disposed adjacent each other in an axial direction of the stator in relation to the N stator pole groups, respectively. The number P of the rotor magnetic poles and the number M of the magnetic poles of the stator are selected to meet a relation of $M<(P/2)\times N$. This structure permits the number of the magnetic poles of the stator to be decreased as compared with a prior art structure, which ensures desired air gaps between the magnetic poles of the stator, thus minimizing a leakage of magnetic flux between the magnetic poles of the stator to increase torque to be outputted by the motor.

In the preferred mode of the invention, the number P of the rotor magnetic poles and the number M of the magnetic poles of the stator may be selected so as to meet conditions in which unit voltages that are rates of changes in rotation angles of magnetic fluxes flowing through the N stator pole groups are substantially identical in waveform and amplitude and shifted in phase angle by 360°/N, as expressed by an electrical angle.

The magnetic poles of the stator may be arranged at irregular intervals away from each other so as to meet conditions in which the unit voltages that are rates of changes in rotation angles of magnetic fluxes flowing through the N stator pole groups are substantially identical in waveform and amplitude and shifted in phase angle by 360°/N, as expressed by an electrical angle.

At least one of widths of the magnetic poles of the stator may be selected to be different from the other or others of the widths of the magnetic poles of the stator so as to meet conditions in which the unit voltages that are rates of changes in rotation angles of magnetic fluxes flowing through the N stator pole groups are substantially identical in waveform and amplitude and shifted in phase angle by 360°/N, as expressed by an electrical angle.

The number of turns of at least one of the windings may be selected to be different from that of the other or others of the windings so as to meet conditions in which voltages, as induced in the N stator pole groups, respectively, which are given by products of unit voltages that are rates of changes in rotation angles of magnetic fluxes flowing through the N stator pole groups are substantially identical in waveform and amplitude and shifted in phase angle by 360°/N, as expressed by an electrical angle.

BRIEF DESCRIPTION OF THE DRAWINGS

The present invention will be understood more fully from the detailed description given hereinbelow and from the accompanying drawings of the preferred embodiments of the invention, which, however, should not be taken to limit the invention to the specific embodiments but are for the purpose of explanation and understanding only.

In the drawings:

FIG. 1 is a longitudinal sectional view which shows a related brushless motor;

FIG. 2 is a development of permanent magnets built in the motor of FIG. 1;

FIG. 3(a) is a transverse sectional view taken along the line AA-AA in FIG. 1;

FIG. 3(b) is a transverse sectional view taken along the line AB-AB in FIG. 1;

FIG. 3(c) is a transverse sectional view taken along the line AC-AC in FIG. 1;

FIG. 4 is a development of an inner circumference of a stator, as viewed from a rotor of the motor in FIG. 1;

DESCRIPTION OF THE PREFERRED EMBODIMENTS

Figures 5A, 5B:
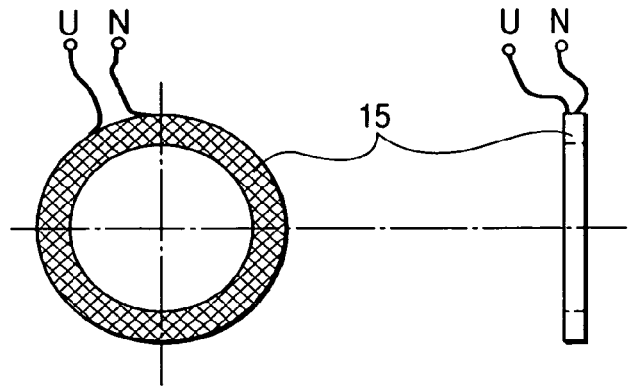
FIG. 5(a) is a plane view which shows a U-phase winding built in the motor of FIG. 1.
FIG. 5(b) is a side view of FIG. 5(a)

Japanese Patent First Publication No. 2005-160285 that is an equivalent to US2005/0099082 A1 filed Nov. 8, 2004, assigned to the same assignee as that of this application, discloses an AC motor and its motor controller having structures similar to those described below, the disclosure of which is incorporated totally herein by reference.

Prior to describing the structure of a brushless motor of the invention, related technologies will be discussed below.

FIG. 1 shows a brushless motor 150 which may be employed in passenger automobiles or autotrucks.

The brushless motor 150 is an 8-pole brushless motor operating on three-phase AC current and includes a rotor 11 and a stator 14.

The rotor 11 has a plurality of permanent magnets 12 disposed around the outer surface thereof. The permanent magnets 12 have north (N) and south (S) poles arrayed alternately along the circumference of the rotor 11. FIG. 2 is a development of the rotor 11 in the circumferential direction thereof. The horizontal axis represents a mechanical angle. A mechanical angle of 360° is equivalent to an electrical angle of 1440°.

The stator 14 is equipped with magnetic poles 19, 20, and 21, four for each phase. The magnetic poles 19 will also be referred to below as U-phase stator poles. The magnetic poles 20 will also be referred to below as V-phase stator poles. The magnetic poles 21 will also be referred to below as W-phase stator poles. Each of the stator poles 19, 20, and 21 is made of a salient pole projecting toward the rotor 11. FIG. 4 is a development of an inner circumference of the stator 14, as viewed from the rotor 11. The four U-phase stator poles 19 are arrayed at equi-intervals around the entire circumference of the stator 14. The four V-phase stator poles 20 are arrayed at equi-intervals around the entire circumference of the stator 14. Similarly, the four W-phase stator poles 21 are arrayed at equi-intervals around the entire circumference of the stator 14. The U-phase stator poles 19, the V-phase stator poles 20, and the W-phase stator poles 21 will also be referred to as a whole as a U-phase stator pole group, a V-phase stator pole group, and a W-phase stator pole group, respectively. Of these groups, two located at ends of the stator 14 opposed in an axial direction thereof, that is, the U-phase stator pole group and the W-phase stator group will also be referred to below as end stator pole groups, while the V-phase stator pole group located between the end stator pole groups will also be referred to below as a middle stator pole group.

The U-phase stator poles 19, the V-phase stator poles 20, and the W-phase stator poles 21 are, as can be seen from the drawing, arrayed in alignment in the circumferential direction of the stator 14, respectively. Each of the U-phase stator poles 19 is out of alignment with one of the V-phase stator poles 20 and one of the W-phase stator poles 21 in the axial direction of the stator 14. Specifically, the U-, V-, and W-stator pole groups are located at an interval of a 30° mechanical angle (i.e., 120° electrical angle) away from each other in the circumferential direction of the stator 14. In other words, the U-, V-, and W-stator pole groups are shifted in the circumferential direction of the stator 14 relatively from a preselected reference one of the N and S poles of the rotor 11 by different angles on a pole basis. Blocks indicated by broken lines in FIG. 4 indicate the permanent magnets 12 of the rotor 11. An interval or pitch between the same poles of the rotor 11 (i.e., between the N poles or between the S poles of the permanent magnets 12) is 360° in electrical angle. The pitch between the same phase stator poles is also 360° in electrical angle.

Figure 6:
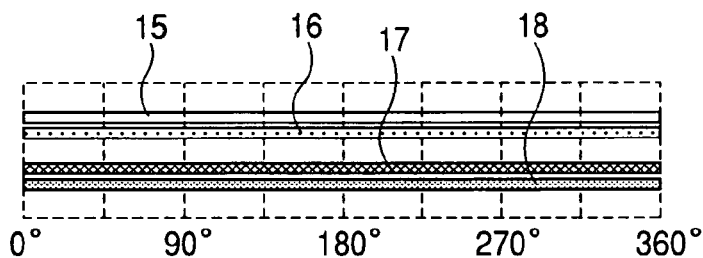
FIG. 6 is a development which shows three-phase windings extending over the circumference of a stator.

A U-phase winding 15, V-phase windings 16 and 17, and a W-phase winding 18 extend between the U-phase stator pole group and the V-phase stator pole group and between the V-phase stator pole group and the W-phase stator pole group. FIG. 6 is a development of the stator 14 which illustrates the layout of the U-phase, V-phase, and W-phase windings 15, 16, 17, and 18. The U-phase winding 15 extends in the form of a loop between the array of the U-phase stator poles 19 and the array of the V-phase stator poles 20. If a flow of electric current in the clockwise direction, as viewed from the rotor 11, is defined as a positive flow, a negative current −Iu is to be applied to the U-phase winding 15. Similarly, the V-phase winding 16 extends in the form of a loop between the array of the U-phase stator poles 19 and the array of the V-phase stator poles 20. A positive current +Iv is to be applied to the V-phase winding 16. The V-phase winding 17 extends in the form of a loop between the array of the V-phase stator poles 20 and the array of the W-phase stator poles 21. A negative current −Iv is to be applied to the V-phase winding 17. The W-phase winding 18 extends in the form of a loop between the array of the V-phase stator poles 20 and the array of the W-phase stator poles 21. A positive current +Iw is to be applied to the W-phase winding 18. The currents Iu, Iv, and Iw are, in general, called three-phase AC currents which are 120° out of phase with each other. A winding 139, as illustrated in FIG. 1, disposed which works to cancel a magnetomotive force oriented in the axial direction of the stator 14.

The configurations of the U-, V-, and W-phase stator poles 19, 20, and 21, and the U-phase, V-phase, and W-phase windings 15, 16, 17, and 18 will be described below in detail.

FIGS. 3(a), 3(b), and 3(c) are transverse sectional views, as taken along the lines AA-AA, AB-AB, and AC-AC in FIG. 1, which illustrates an internal structure of the stator 14. The U-phase stator poles 19, the V-phase stator poles 20, and the W-phase stator poles 21 are each made of a salient pole projecting toward the outer periphery of the rotor 11 and located 30°, as expressed by an mechanical angle (i.e., an electrical angle of 120°), out of phase with each other.

FIGS. 5(a) and 5(b) show the U-phase winding 15. The U-phase winding 15 has a leading terminal U and a trailing terminal N. Similarly, the V-phase winding 16 and 17 each have a leading terminal V and a trailing terminal N. Similarly, the W-phase winding 18 has a leading terminal W and a trailing terminal N. When the windings 15, 16, 17, and 18 are to be coupled with a three-phase Y-connection, the trailing terminals N of all the windings 15, 16, 17, and 18 are joined together. The phase currents Iu, Iv, and Iw flowing through the windings 15, 16, 17, and 18 are to be so controlled in phase as to meet a relation of Iu+Iv+Iw=0, thereby producing the torque between the stator poles 19, 20, and 21 and the permanent magnets 12 of the rotor 11.

Figure 8:
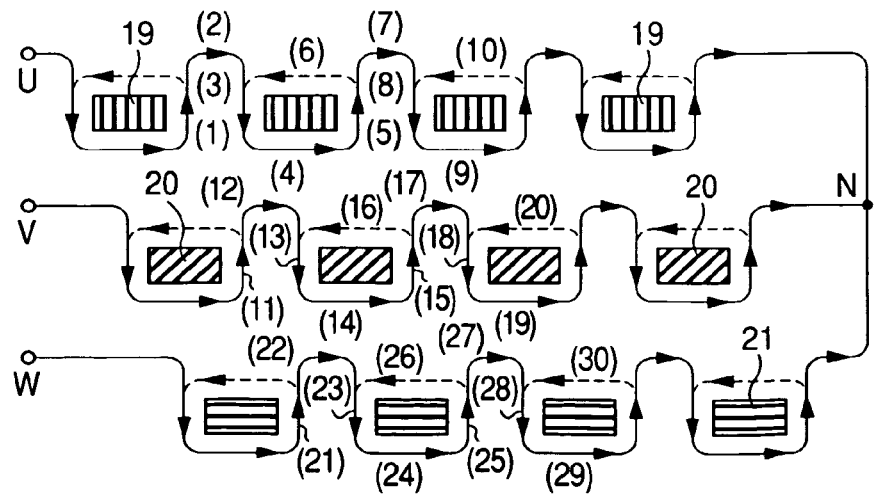
FIG. 8 is a development, as viewed from a rotor of the motor of FIG. 1, which shows windings and stator magnetic poles.

The relation between each of the phase currents Iu, Iv, and Iw and the magnetomotive force acting on one of the stator poles 19, 20, and 21 will be discussed below. FIG. 8 is a development which shows the stator poles 19, 20, and 21, as illustrated in FIG. 4, which are coupled through U-, V-, and W-phase windings electrically equivalent to the U-, V-, and W-phase windings 15, 16, 17, and 18.

In FIG. 8, the U-phase winding is wound around the four U-phase stator poles 19 in series in the same direction. This causes the magnetomotive force to be applied to all the U-phase stator poles 19 in the same direction. For instance, each of turns of the U-phase winding wound around the second U-phase stator pole 19 from the left in FIG. 8 is made up of conductor segments (3), (4), (5), and (6). Conductor segments (2) and (7) serve as connecting wires each of which extends between adjacent two of the U-phase stator poles 19 and do not function electromagnetically.

The current Iu flows through the conductor segments (1) and (3) at the same magnitude, but in opposite directions, so that magnetomotive forces (ampere-turn) are cancelled. The state of the conductor segments (1) and (3) is, therefore, substantially equivalent to that when no current flows through the conductor segments (1) and (3). Similarly, the magnetomotive forces, as produced by the conductor segments (5) and (8), are cancelled. The state of the conductor segments (5) and (8) is substantially equivalent to that when no current flows through the conductor segments (5) and (8). Specifically, the current Iu flowing through sections of the U-phase winding between adjacent two of the U-phase stator poles 19 may be viewed as not producing the magnetomotive force, thus eliminating the need for electrical current flowing through those sections of the U-phase winding and permitting them to be omitted. Consequently, the state of the U-phase winding through which the current Iu is flowing may be viewed as being the same as the case where the positive current Iu is flowing in a loop path (will also be referred to as an outside loop path below), as defined to extend over the circumference of the stator 14 to include the conductor segments (10) and (6), while, at the same time, the negative current −Iu is flowing in another loop path (will also be referred to as an inside loop path below), as defined to extend in the circumference of the stator 14 to include the conductor segments (4) and (9).

The current Iu flowing through the outside loop path which partially includes the conductor segments (10) and (6) is the current flowing outside a core of the stator 14. Usually, the air exists outside the stator core. The air is greater in magnetic resistance and does not act electromagnetically on the brushless motor 150, thus allowing the outside loop path to be omitted. The operation of the U-phase winding, as illustrated in FIG. 8, may, thus, be considered as being equivalent to that of the looped U-phase winding 15 in FIGS. 1 and 6.

The V-phase winding, as illustrated in FIG. 8, is made up of turns which are, like the U-phase winding, wound around the four V-phase stator poles 20 in series in the same direction. The current Iv flows through the conductor segments (11) and (13) at the same magnitude, but in opposite directions, so that magnetomotive forces (ampere-turn) are cancelled. The state of the conductor segments (11) and (13) is, therefore, substantially equivalent to that when no current flows through the conductor segments (11) and (13). Similarly, the magnetomotive forces, as produced by the conductor segments (15) and (18), are also cancelled. Consequently, the state of the V-phase winding through which the current Iu is flowing may be viewed as being the same as the case where the positive current Iv is flowing in a loop path, as defined to extend in the circumference of the stator 14 to include the conductor segments (20) and (16), while, at the same time, the negative current −Iv is flowing in another loop path, as defined to extend in the circumference of the stator 14 to include the conductor segments (14) and (19). The operation of the V-phase winding, as illustrated in FIG. 8, may, thus, be considered as being equivalent to that of a combination of the looped V-phase windings 16 and 17 in FIGS. 1 and 6.

The W-phase winding, as illustrated in FIG. 8, is made up of turns which are, like the U-phase winding, wound around the four W-phase stator poles 21 in series in the same direction. The current Iw flows through the conductor segments (21) and (23) at the same magnitude, but in opposite directions, so that magnetomotive forces (ampere-turn) are cancelled. The state of the conductor segments (21) and (23) is, therefore, substantially equivalent to that when no current flows through the conductor segments (21) and (23). Similarly, the magnetomotive forces, as produced by the conductor segments (25) and (28), are also cancelled. Consequently, the state of the W-phase winding through which the current Iw is flowing may be viewed as being the same as the case where the positive current Iw is flowing in a loop path (will also be referred to as an inside loop path below), as defined to extend in the circumference of the stator 14 to include the conductor segments (30) and (26), while, at the same time, the negative current −Iw is flowing in another loop path (will also be referred to as an outside loop path below), as defined to extend in the circumference of the stator 14 to include the conductor segments (24) and (29).

The current −Iw flowing through the inside loop path which includes the conductor segments (24) and (29) is the current flowing outside the core of the stator 14. The air usually exists outside the stator core. The air is greater in magnetic resistance and does not act electromagnetically on the brushless motor 150, thus allowing the outside loop path to be omitted. The operation of the W-phase winding, as illustrated in FIG. 8, may, thus, be considered as being equivalent to that of the looped W-phase winding 18 in FIGS. 1 and 6.

As apparent from the above discussion, the U-phase, V-phase, and W-phase windings 15, 16, 17, and 18 used in the brushless motor 150 each of which is made of a looped winding are equivalent in electromagnetic operation to the U-phase, V-phase, and W-phase windings, as illustrated in FIG. 8, each made up of sets of turns wound around the U-phase, V-phase, and W-phase stator poles 19, 20, and 21. There is also no need for windings to be disposed outside the axially opposed ends of the stator 14. The use of the U-phase, V-phase, and W-phase windings 15, 16, 17, and 18 each made of the looped winding, therefore, result in a great decrease in amount of copper to be used in the brushless motor 150, thus achieving higher efficiency in operation of and output of higher torque from the brushless motor 150. Additionally, there is no need for any winding to be disposed between circumferentially adjacent two of each of the groups of the U-phase, V-phase, and W-phase stator poles 19, 20, and 21, thus permitting the number of poles to be increased as compared with the conventional structure. The simple structure of the U-phase, V-phase, and W-phase windings 15, 16, 17, and 18 also results in improved productivity and decreased manufacturing costs of the brushless motor 150.

Figure 30:
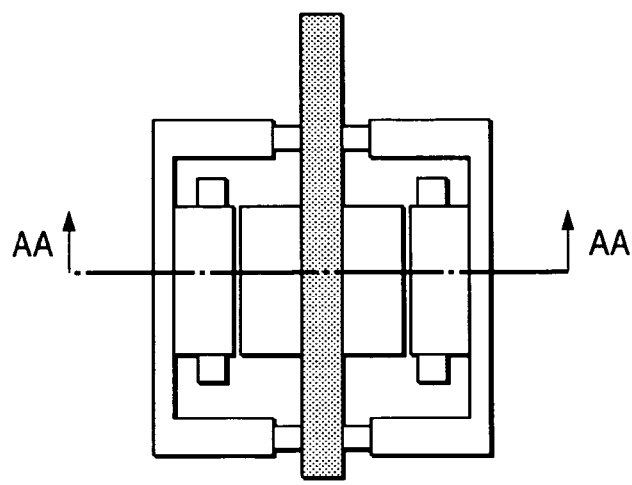
FIG. 30 is a longitudinal sectional view which shows a conventional brushless motor.
Figure 31:
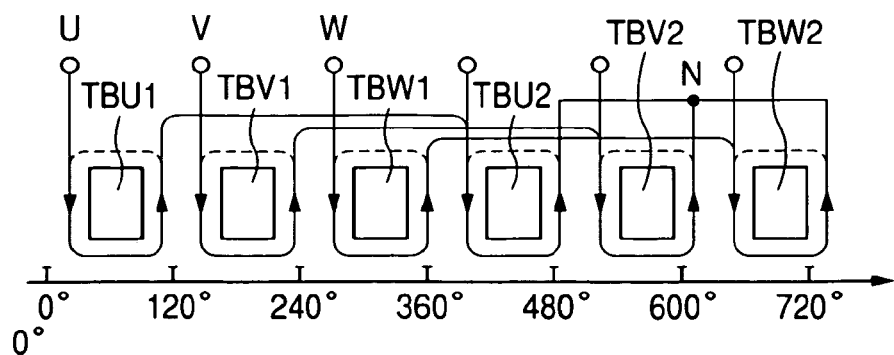
FIG. 31 is a development which shows stator magnetic poles and windings in the motor of FIG. 30.
Figure 32:
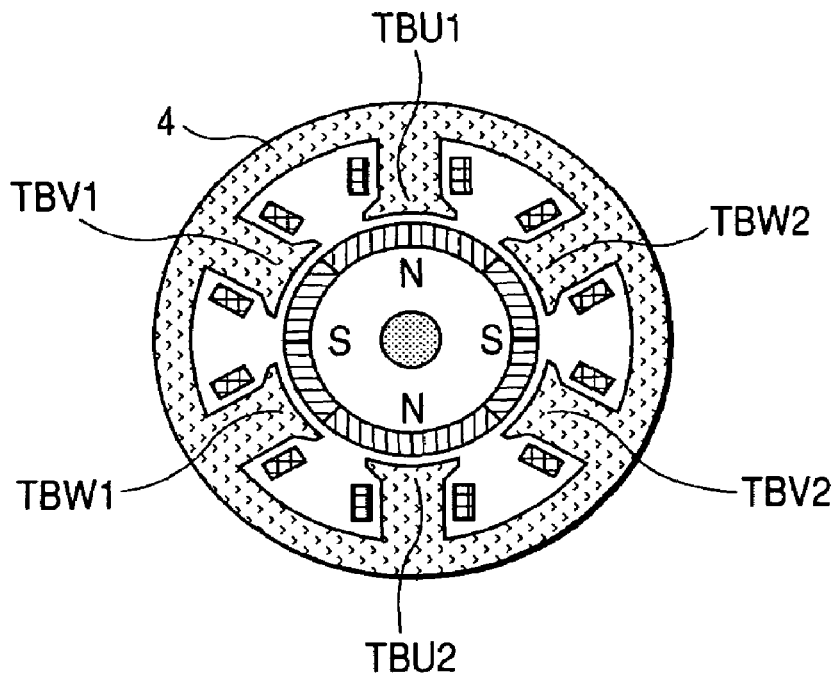
FIG. 32 is a transverse sectional view taken along the line AA-AA in FIG. 30.
Figure 33:
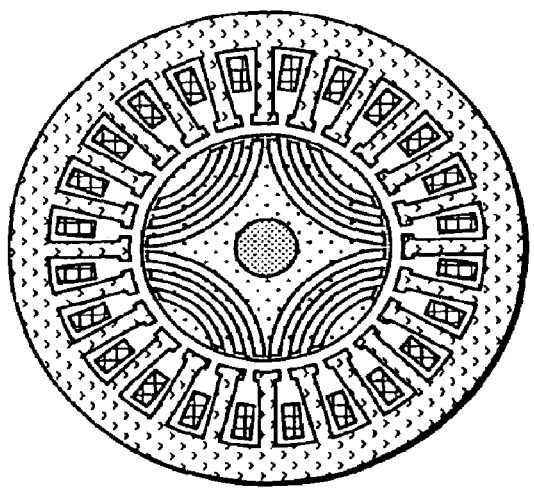
FIG. 33 is a transverse sectional view which shows modified forms of a rotor and a stator installed in the motor of FIG. 30.

Magnetic fluxes $\phi u$, $\phi v$, and $\phi w$ passing through the U-phase, V-phase and W-phase stator poles 19, 20, and 21 flow together magnetically at a back yoke so that a total of the magnetic fluxes $\phi u$, $\phi v$, and $\phi w$ will be zero (i.e., $\phi u + \phi v + \phi w = 0$). The prior art brushless motor, as illustrated in FIGS. 30, 31 and 32, has the structure equivalent to that in which a total of six including two of the U-phase stator poles 19, two of the V-phase stator poles 20, and two of the W-phase stator poles 21, as illustrated in FIG. 8, are aligned in a circle and is identical in magnetic operation and production of torque with the brushless motor 150. The prior art brushless motor, however, unlike the brushless motor 150, has structural difficulties in omitting a portion of the windings or simplifying the structure thereof.

Figure 9:
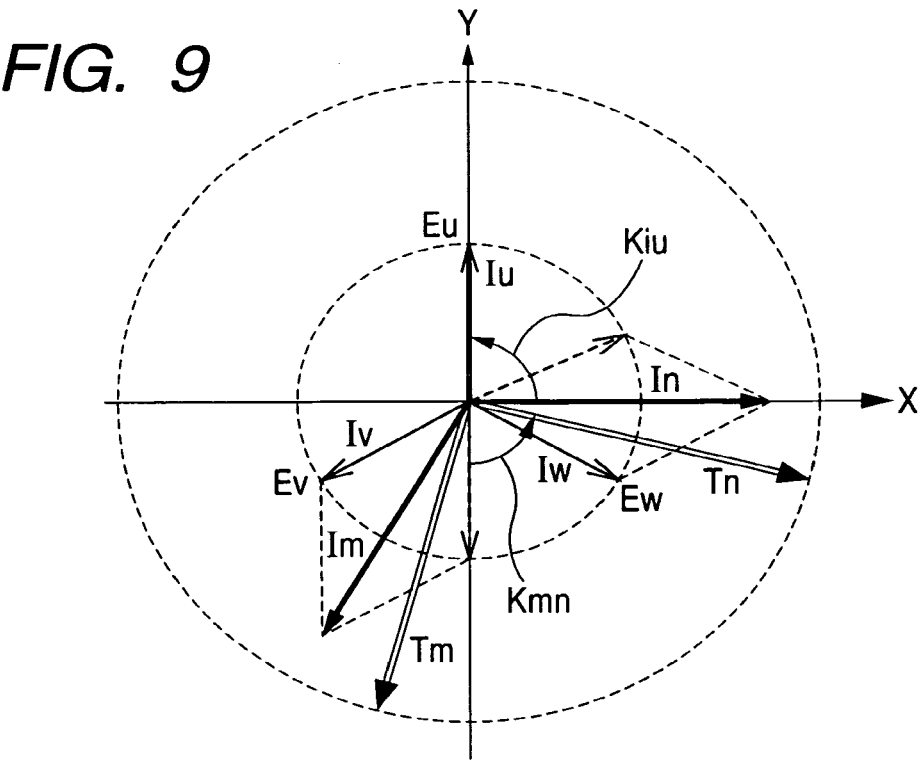
FIG. 9 is a vector diagram which shows a relation among currents Iu, Iv, and Iw, unit voltages Eu, Ev, and Ew, and output torques Tu, Tu, and Tw in three phases of the brushless motor of FIG. 1.

The operation of the brushless motor 150 will be described below. FIG. 9 is a vector diagram which shows a relation among the currents Iu, Iv, and Iw, unit voltages Eu, Ev, and Ew, and output torques Tu, Tu, and Tw in the brushless motor 150.

In the following discussion, rates of changes in rotation angles of the magnetic fluxes $\phi u$, $\phi v$, and $\phi w$ flowing through the U-phase, V-phase, and W-phase stator poles 19, 20, and 21 are defined as the unit voltages Eu, Ev, and Ew, respectively. The unit voltage Eu is expressed by $Eu = d\phi u/d\theta$. The unit voltage Ev is expressed by $Ev = d\phi v/d\theta$. The unit voltage Ew is expressed by $Ew = d\phi w/d\theta$. The locations of the U-phase, V-phase, and W-phase stator poles 19, 20, and 21 relative to the rotor 11 (i.e., the permanent magnets 12) are, as shown in FIG. 4, out of alignment by an electrical angle of 120°. The unit voltages Eu, Ev, and Ew each of which is induced in one turn of a corresponding one of the U-phase, V-phase, and W-phase windings 15 to 18, will, therefore, be three-phase AC voltages illustrated in FIG. 9.

Assuming that the rotor 11 is turning at a constant rate of $d\theta/dt = S1$, and if the numbers of turns of the U-phase, V-phase, and W-phase windings 15 to 18 are defined as Wu, Wv, and Ww, respectively, the sum of which is defined as Wc, voltages Vu, Vv, and Vw induced in the U-phase, V-phase, and W-phase windings 15 to 18 may be expressed below. If components of the magnetic fluxes $\phi u$, $\phi v$, and $\phi w$ leaking from the stator poles 19 to 21 are neglected, the number of flux linkages of the U-phase winding 15 is expressed by $Wu \times \phi u$, the number of flux linkages of the V-phase windings 16 and 17 is expressed by $Wv \times \phi v$, and the number of flux linkages of the W-phase winding 18 is expressed by $Ww \times \phi w$.

$$Vu = Wu \times (-d\phi u/dt) \qquad (1)$$
$$= -Wu \times d\phi u/d\theta \times d\theta/dt$$
$$= -Wu \times Eu \times S1$$

Similarly, $$Vv = Wv \times Ev \times S1 \qquad (2)$$

$$Vw = Ww \times Ew \times S1 \qquad (3)$$

The specific relations among the windings 15 to 18 and the induced voltages Vu, Vv, and Vw are as follows: The unit voltage Eu is the voltage which is developed at one turn of the U-phase winding 15, as illustrated in FIGS. 1 and 6, and oriented in a direction reverse to a direction of winding of the U-phase winding 15. The induced voltage Vu is the voltage which is developed at the whole of the U-phase winding 15 and oriented in the direction reverse to the direction of winding of the U-phase winding 15. The unit voltage Ev is the voltage which is developed across ends of a conductor made by joining together in series one turn of the V-phase winding 16 and one turn of the V-phase winding 17 which is oriented in a direction reverse to a direction of winding of the U-phase winding 16 together. The induced voltage Vv is the voltage which is developed at ends of a winding made by joining together in series the V-phase winding 16 and the V-phase winding 17 which is wound in the direction reverse to the direction of winding of the V-phase winding 16. The unit voltage Ew is the voltage which is developed at one turn of the W-phase winding 18. The induced voltage Vw is the voltage which is developed at the whole of the U-phase winding 15 and oriented in the direction reverse to the direction of winding of the W-phase winding 18.

Increasing the efficiency in producing the torque in the brushless motor 150 requires matching the phase of each of the U-phase, V-phase, and W-phase currents Iu, Iv, and Iw with that of a corresponding one of the U-phase, V-phase, and W-phase unit voltages Eu, Ev, and Ew. FIG. 9 illustrates the U-phase, V-phase, and W-phase currents Iu, Iv, and Iw as being in phase with the U-phase, V-phase, and W-phase unit voltages Eu, Ev, and Ew, respectively, and represents each voltage vector and each current vector which are in phase with each other by the same vector arrow.

The output power Pa of the brushless motor 150 and powers Pu, Pv, and Pw in the U-, V-, and W-phases are $$Pu = Vu \times (-Iu) = Wu \times Eu \times S1 \times Iu \quad (4)$$

$$Pv = Vv \times Iv = Wv \times Ev \times S1 \times Iv \quad (5)$$

$$Pw = Vw \times Iw = Ww \times Ew \times S1 \times Iw \quad (6)$$

$$Pa = Pu + Pv + Pw = Vu \times Iu + Vv \times Iv + Vw \times Iw \quad (7)$$

The output torque Ta of the brushless motor 150 and torques Tu, and Tw produced in the U-, V-, and W-phases are $$Tu = Pu/S1 = Wu \times Eu \times Iu \quad (8)$$

$$Tv = Pv/S1 = Wv \times Ev \times Iv \quad (9)$$

$$Tw = Pw/S1 = Ww \times Ew \times Iw \quad (10)$$

$$\begin{aligned} Ta &= Tu + Tv + Tw \\ &= Wu \times Eu \times Iu + Wv \times Ev \times Iv + Ww \times Ew \times Iw \\ &= Wc \times (Eu \times Iu + Ev \times Iv + Ew \times Iw) \end{aligned} \quad (11)$$

The voltage-current-torque vector diagram of the brushless motor 150, as illustrated in FIG. 9, is the same as that of the prior art brushless motor in FIGS. 30, 31, and 32.

A modified form of the stator 14 will be described below which is designed to have a simplified stator winding structure.

The U-phase winding 15 and the V-phase winding 16 are, as described above, made of looped windings disposed adjacent each other between the array of the U-phase stator poles 19 and the array of the V-phase stator poles 20, but they may alternatively be made of a single looped winding. Similarly, the V-phase winding 17 and the W-phase winding 18 disposed between the array of the V-phase stator poles 20 and the array of the W-phase stator poles 21 may alternatively be made of a single looped winding.

Figure 7:
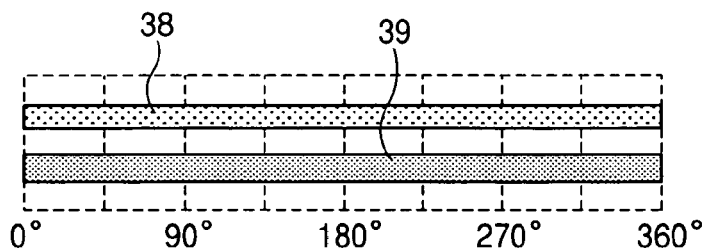
FIG. 7 is a development which shows modified forms of three-phase windings extending over the circumference of a stator.

FIG. 7 is a development which shows the above modified structure of the stator 14. Numeral 38 indicates an M-phase winding 38 functioning as a combination of the U-phase winding 15 and the V-phase winding 16. Numeral 39 indicates an N-phase winding functioning as a combination of the V-phase winding 17 and the W-phase winding 18. In operation, the state of magnetic flux produced by the M-phase winding 38 that is magnetically identical with that of a combination of magnetic fluxes produced by the U-phase winding 15 and the V-phase winding 16 is established by producing, in the M-phase winding 38, a flow of M-phase current Im (=−Iu+Iv) that is the sum of the current −Iu to be applied to the U-phase winding 15 and current Iv to be applied to the V-phase winding 16. Similarly, the state of magnetic flux produced by the N-phase winding 39 that is magnetically identical with that of a combination of magnetic fluxes produced by the V-phase winding 17 and the W-phase winding 18 is established by producing, in the N-phase winding 39, a flow of N-phase current In (=−Iv+Iw) that is the sum of the current −Iv to be applied to the V-phase winding 17 and current Iw to be applied to the W-phase winding 18.

The above states magnetic fluxes produced by the M-phase winding 38 and the N-phase winding 39 are also demonstrated in FIG. 9. A unit voltage developed at the M-phase winding 38 is expressed by Em. A unit voltage developed at the N-phase winding 39 is expressed by En. The unit voltages Em and En are given by $$Em = -Eu = -d\phi u/d\theta$$

$$En = Ew = d\phi w/d\theta$$

The voltages Vm and Vn induced int the M-phase and N-phase windings 38 and 39, the powers Pm and Pn dissipated in the M-phase and N-phase windings 38 and 39, the power Pb dissipated in the brushless motor 150, the torques Tm and Tn produced by the M-phase and N-phase windings 38 and 39, and the torque Tb outputted by the brushless motor 150 are given by $$Vm = Wc \times Em \times S1 \quad (12)$$

$$Vn = Wc \times En \times S1 \quad (13)$$

$$\begin{aligned} Pm &= Vm \times Im = Wc \times (-Eu) \times S1 \times (-Iu + Iv) \\ &= Wc \times Eu \times S1 \times (-Iu + Iv) \end{aligned} \quad (14)$$

$$Pn = Vn \times In = Wc \times Ew \times S1 \times (-Iv + Iw) \quad (15)$$

$$Pb = Pm + Pn = Vu \times (-Iu + Iv) + Vw \times (-Iv + Iw) \quad (16)$$

$$Tm = Pm/S1 = Wc \times (-Eu) \times (-Iu + Iv) \quad (17)$$

$$Tn = Pn/S1 = Wc \times Ew \times (-Iu + Iw) \quad (18)$$

$$\begin{aligned} Tb &= Tm + Tn = Wc \times ((-Eu \times Im) + Ew \times In) \\ &= Wc \times (-Eu \times (-Iu + Iv) + Ew \times (-Iv + Iw)) \\ &= Wc \times Eu \times Iu + Wc \times Iv \times (-Eu - Ew) + Wc \times Ew \times Iw \\ &= Wc \times (Eu \times Iu + Ev \times Iv + Ew \times Iw) \end{aligned} \quad (19)$$

$$\because Eu + Ev + Ew = 0 \quad (21)$$

The torque Ta, as given by Eq. (11), is expressed in the three phases, while the torque Tb, as given by Eq. (19), is expressed in two phases. Expanding Eq. (19), we obtain Eq. (20). It is, thus, found that Eqs. (11) and (19) are mathematically equivalent to each other. Especially, when the voltages Vu, Vv, and Vw and the currents Iu, Iv, and Iw are developed in the form of balanced three-phase AC, the torque Ta, as expressed by Eq. (11), will be constant, and the torque Tb, expressed by Eq. (19), will also be constant which is given, as can be seen from FIG. 9, by the sum of square functions of sine waves which are out of phase by Kmn=90° that is a phase difference between the torques Tm and Tn.

Eq. (19) applies to two-phase AC motors, while Eqs. (11) and (21) apply to three-phase AC motors, however, they are equivalent in value. The cases where the current Im (=−Iu+Iv) is applied to the M-phase winding 38 and where currents −Iu and Iv are applied to the U-phase winging 15 and the V-phase winding 16, respectively, are identical with each other electromagnetically in Eq. (19), but different in copper loss. As can be seen from FIG. 9, a component of the current Im in the real axis decreases to a value derived by multiplying the current Im by cos 30°. The copper loss when the current Im is applied to the M-phase winding 38 will, thus, be 75%, so that it is smaller than when the currents −Iu and Iv are applied to the U-phase winging 15 and the V-phase winding 16 by 25%.

Specifically, combining adjacent discrete looped windings into one results in a simplified structure as well as a decrease in the copper loss thereof, which ensures the improvement of productivity of motors at low cost.

Figure 10:
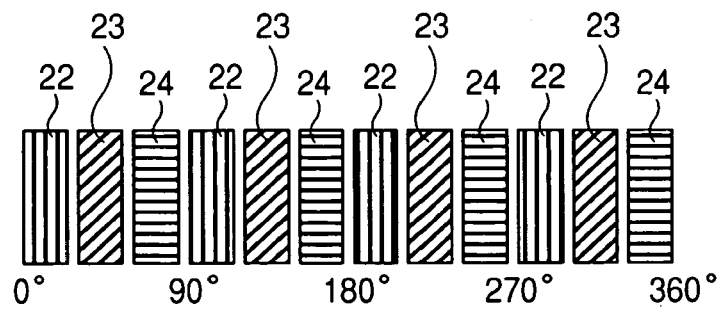
FIG. 10 is a development which shows a second modified form of stator poles.

FIG. 10 is a development which shows a second modified form of the stator 14 of the brushless motor 150 in FIG. 1. Usually, the configuration of magnetic poles of a stator is a factor affecting torque characteristics of the brushless motor and closely linked to cogging torque ripples and torque ripples to be induced by flows of current applied to the motor. In order to alleviate such problems, the stator 14 is designed to have U-phase stator poles 22, V-phase stator poles 23, and W-phase stator poles 24, as illustrated in the drawing.

Each of the stator poles 22, 23, and 24 extends substantially parallel to the peripheral wall of the rotor 11 (i.e., a shaft of the rotor 11). The U-phase stator poles 22 are identical in profile with each other. The V-phase stator poles 23 are identical in profile with each other. The W-phase stator poles 24 are identical in profile with each other. Each of the U-phase stator poles 22 is formed by extending one of teeth 14a, as illustrated in FIG. 1, downward to the bottom of the stator 14. Each of the V-phase stator poles 23 is formed by extending upper and lower ends of one of teeth 14b vertically to the top and the bottom of the stator 14. Each of the W-phase stator poles 24 is formed by extending one of teeth 14c upward to the top of the stator 14. Each of the U-phase stator poles 22 is located at an electrical angle of 120° away from an adjacent one of the V-phase stator poles 23. Similarly, each of the V-phase stator poles 23 is located at an electrical angle of 120° away from an adjacent one of the W-phase stator poles 24. Use of such stator poles usually results in the problem of an increase in the torque ripple. In order to avoid such a problem, each of the stator poles 22, 23, and 24 has chamfered side edges. In other words, each of the stator poles 22, 23, and 24 has a U-shaped cross section, as viewed from the vertical direction thereof, which serves to smooth magnetic effects at the side edges, thereby decreasing the torque ripples. The decreasing of the torque ripples may alternatively be achieved by chamfering side edges of each of the permanent magnets 12 of the rotor 11 to establish a magnetic flux distribution in the form of a sine wave in the circumferential direction of the rotor 11. Numerals 0°, 90°, etc. are mechanical angles in the circumferential direction of the rotor 11. The whole of the circumference of the stator 14 ranges over 360°.

Figure 11:
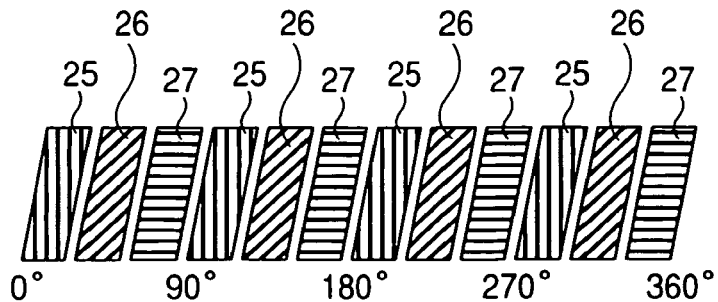
FIG. 11 is a development which shows a third modified form of stator poles.

FIG. 11 is a development which shows a third modified form of the stator 14 of the brushless motor 150 in FIG. 1.

The stator 14 is equipped with U-phase stator poles 25, V-phase stator poles 26, and W-phase stator poles 27. Each of the stator poles 25, 26, and 27 skews in the circumferential direction of the stator 14 at an electrical angle of approximately 60° to the axis of the rotor 11, thereby resulting in a decrease in the torque ripple. The width of each of the stator poles 25, 26, and 27 is smaller than 180°, thereby resulting in no decrease in maximum magnetic flux passing therethrough which ensures an average value of the torque. Each of the stator poles 25, 26, and 27 may have, like the one in FIG. 10, chamfered side edges.

The U-phase stator poles 22, the V-phase stator poles 23, and the W-phase stator poles 24 in FIG. 10 are, as described above, formed by extending the ends of the teeth 14a, 14b, and 14c, as illustrated in FIG. 1, vertically. Ensuring desired volumes of magnetic paths in the stator poles 22, 23 and 24 requires increasing volumes, especially of corners of the teeth 14a, 14b, and 14c, thus resulting in an increased overall size of the motor 150. The same is true for the structure, as illustrated in FIG. 11.

Figure 12:
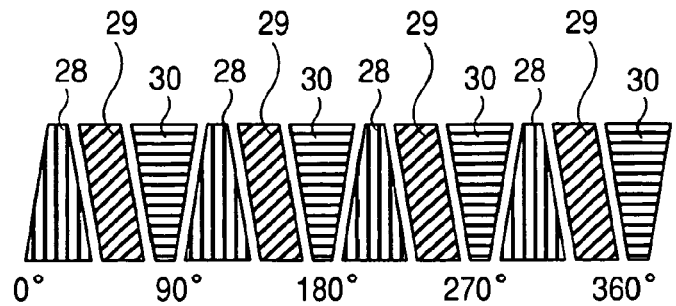
FIG. 12 is a development which shows a fourth modified form of stator poles.

FIG. 12 is a development which shows a fourth modified form of the stator 14 of the brushless motor 150 in FIG. 1 in order to alleviate the above problem.

The stator 14 is equipped with U-phase stator poles 28, V-phase stator poles 29, and W-phase stator poles 30 which are so shaped that the unit voltages Eu (=dϕu/dθ), Ev (=dϕv/dθ), and Ew (=dϕw/dθ) that are rates of changes in rotation angles of the magnetic fluxes ϕu, ϕv, and ϕw flowing through the U-phase, V-phase, and W-phase stator poles 28, 29 and 30 are almost identical in waveform and amplitude with each other and shifted in phase from each other by an electrical angle of 120°. Each of the stator poles 28 and 30 has a maximum width (i.e., volume) at the corner of a corresponding one of the teeth 14c and 14a (see FIG. 1) to ensure a desired volume of the magnetic path. The magnetic flux flows from the rotor 11 to the surface (i.e., an inner surface facing the rotor 11) of each of the teeth 14a and 14c, to the corners thereof having an increased volume, and to the backyoke of the stator 14 (i.e., an outer peripheral wall of the stator 14). This structure of the stator poles 28 and 30 permits the overall size of the motor 150 to be reduced as compared with the one of FIG. 10 or 11.

Figure 13:
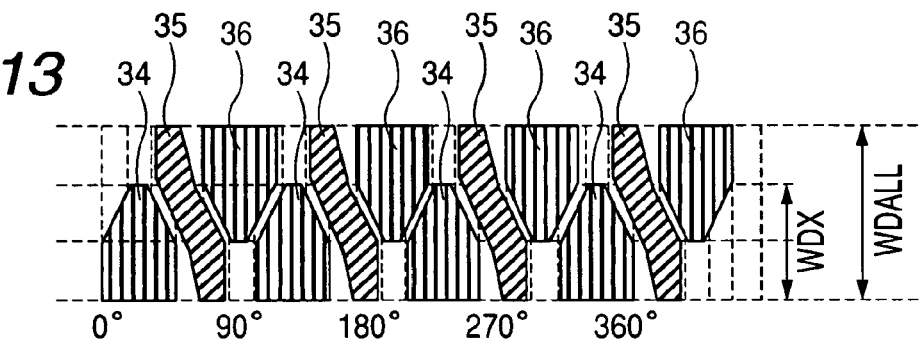
FIG. 13 is a development which shows a fifth modified form of stator poles.
Figure 14:
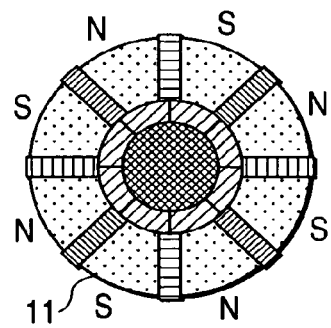
FIGS. 14, 15, 16, 17, 18, and 19 are transverse sectional views which show modifications of a rotor of the motor in FIG. 1.
Figure 15:
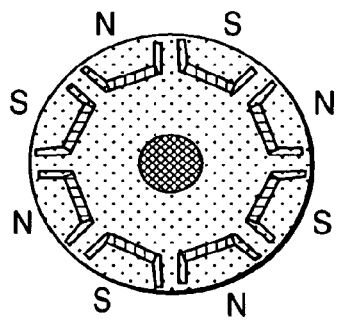
Figure 16:
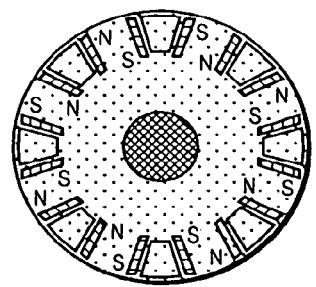
Figure 17:
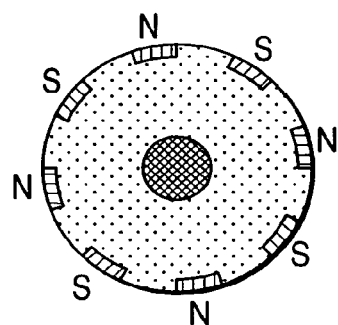
Figure 18:
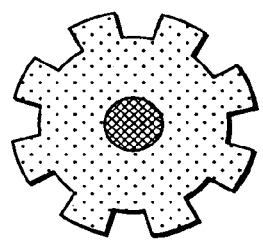
Figure 19:
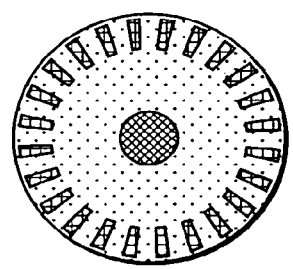

FIG. 13 is a development which shows a fifth modified form of the stator 14 of the brushless motor 150 in FIG. 1.

The stator 14 is equipped with U-phase stator poles 34, V-phase stator poles 35, and W-phase stator poles 36. The U-phase stator poles 34 and the W-phase stator poles 36 are shifted from each other in the axial direction of the rotor 11 and have a maximum width of 180° electrical angle. Each of the V-phase stator poles 35 are disposed between one of the U-phase stator poles 34 and an adjacent one of the W-phase stator poles 35 symmetrically therewith. Each of the U-phase stator poles 34 and the W-phase stator poles 35 has no thin tip portion formed on a corresponding one of the teeth 14c and 14a (see FIG. 1) because it is remote from the backyoke and difficult to machine.

The U-phase stator poles 34, V-phase stator poles 35, and W-phase stator poles 36 are so formed that the unit voltages Eu, Eu, and Ew that are rates of changes in rotation angles of the magnetic fluxes ϕu, ϕv, and ϕw flowing through the U-phase, V-phase, and W-phase stator poles 34, 35 and 36 are almost identical in value, but different in phase. This structure permits a relatively great effective magnetic flux to pass through the U-phase stator poles 34 and the W-phase stator poles 36 and results in ease of machining of the stator poles 34 to 36.

FIGS. 14, 15, 16, 17, 18, and 19 illustrate modified forms of the rotor 11 which may be employed in the structure of FIG. 1. These structures of the rotor 11 are known in the art, and explanation thereof in detail will be omitted here.

A brushless motor according to the invention will be described below in detail. The brushless motor has substantially the same structure, as illustrated in FIG. 1. Like parts will be referred to using like reference numbers.

The brushless motor 150 of the invention may be designed to have the stator poles 22, 23, and 24, as illustrated in FIG. 10, arrayed in a direction of rotation of the rotor 11. When an air gap between adjacent two of the stator poles 22 to 24 is decreased, it may result in an increased amount of leakage of magnetic flux between them, so that magnetic circuits short in the stator 14, thus resulting in a decreased amount of torque to be outputted by the motor 150. This phenomenon will appear noticeably when greater currents are applied to the windings 15 to 18. Consequently, the output torque increases linearly as the currents increase to a certain value and is then saturated.

Increasing the number of poles of the rotor 11 or decreasing the inner diameter of the stator 14 will result in decreased air gaps between the stator poles 22 to 24 unless the size of the motor 150 is increased. This will be a critical problem in a case where the motor 150 is designed to be compact in size or have a increased number of poles of the rotor 11.

The motor 150 of the invention is designed to be equipped with typical concentrated windings. If the number of phases of the motor 150 is defined as N and the number of poles of the rotor 11 is defined as P, the number M of poles of the stator 14 is basically given by a relation of M=P/2×N. In the case where the motor 150 is designed as a three-phase motor to have eight poles of the rotor 11, the number M of the poles of the stator 14 will be twelve (12).

When the number P of poles of the rotor 11 or the inner diameter of the stator 14 is not greater enough to ensure a desired size of air gaps between the poles of the stator 14 in the above combination of the number P of poles of the rotor 11 and the number M of poles of the stator 14, the torque characteristics of the motor 150 may be improved by decreasing the number M of poles of the stator 14 so as to meet a relation of M<P/2×N.

Tanking an example where the motor 150 is designed to have three phases and eight poles of the rotor 11, a basic number of poles of the stator 11 will be twelve (12). When the width of the poles of the stator 14 is a mechanical angle of 20° and the width of air gaps between the poles of the stator 14 is a mechanical angle of 10° which is insufficient to avoid the leakage of magnetic flux between the poles of the stator 14, the number M of the poles of the stator 14 may be preferably decreased to increase the width of the air gaps between the poles of the stator 14. For instance, when the width of the poles of the stator 11 is fixed at 20°, the number M of poles of the stator 14 may be decreased from 12 to 11, 10, or 9 to increase the width of the air gaps between the poles of the stator to 12.72°, 16°, or 20°.

The smaller the number M of the poles of the stator 14, the greater the width of the air gaps between the poles of the stator 14 will be. However, the decrease in the number of the poles of the stator 14 will result in a drop in torque to be outputted by the motor 150. It is, therefore, necessary for designing the motor 150 to ensure an optimum balance among the number M of the poles of the stator 14, the width of the poles of the stator 14, and the width of the air gaps between the poles of the stator 14.

The number P of the poles of the rotor 11 and the number M of the poles of the stator 14 may be, as described later in detail, selected from a variety of combinations regardless of the number N of phases of the motor 150. Specifically, it is advisable that the number M of the poles of the stator 14 be selected so as to meet the relation of M<P/2×N.

Some of the combinations of the number P of the poles of the rotor 11 and the number M of the poles of the stator 14 may result in problems such as an increase in torque ripple of the motor 150. The combinations which do not contribute to such a problem will be discussed below. Of course, other combinations may be available if the motor 150 is employed in applications where the torque ripple is not objectionable.

As referred to in the discussion of the related technologies, in the case where the motor 150 is an N-phase motor, the torque ripple may be decreased by applying currents to windings of the stator 14 which are in phase with induced voltages given by products of the unit voltages, as discussed above, that are rates of changes in rotation angles of magnetic fluxes flowing through the poles of the stator 14 and the numbers of turns of the windings of the N phases when the induced voltages are identical in waveform and amplitude with each other and shifted in phase by an electrical angle of 360°/N.

However, when the poles of the stator 14 are located at equi-intervals away from each other, the combinations of the number P of the poles of the rotor 11 and the number M of the poles of the stator 14 where the induced voltages are identical in waveform and amplitude with each other and shifted in phase by 360°/N, as expressed by an electrical angle, are allowed to be selected only under specified conditions. The conditions for the combinations of the number P of the poles of the rotor 11 and the number M of the poles of the stator 14, selection of the poles of the stator 14 which are the same in phase, and concepts thereof will be discussed below taking an example of a three-phase motor.

In the following discussion, the magnitude and phase of voltage induced by each of the poles of the stator 14 will be expressed by two-dimensional vectors which are referred to as induced voltage vectors.

The induced voltage vectors are identical in number with the poles of the stator 14, but may be in phase with each other depending upon phase differences between the vectors. The number of the induced voltage vectors which are different in phase angle is, therefore, not always identical with the number M of the poles of the stator 14.

The three-phase motor, as described above, needs to meet the conditions that the voltages induced by the poles of the stator 14 are identical in amplitude with each other and shifted in phase by 120°. Such conditions are satisfied when as many induced voltage vectors as an integral multiple of three (3) lie at equi-intervals away from each other on the phases. In this case, if ones of the induced voltage vectors which are shifted in phase angle by 120° from each other are defined as a vector set, the number of the vector sets will be an integral number. If each of the induced voltage vectors of one of the vector sets and ones of the induced voltages of the other vector sets which are closer in orientation to each other are combined into a vector sum, the vector sums which are identical in magnitude with each other will lie at an interval of a 120° phase angle.

The condition for such a layout of the induced voltage vectors will be described. If the number of the poles of the rotor 11 is defined as P, the number of the poles of the stator 14 is defined as M, and the greatest common factor of P/2 and M is defined as Y, the greatest common factor Y will be equal to the number of in-phase combinations each consisting of pairs of the poles of the rotor 11 (i.e., pairs of the N poles and the S poles of the magnets 12) and ones of the poles of the stator 14 which are the same in phase. For instance, when the number of the poles of the rotor 11 is twelve (12), and the number of the poles of the stator 14 is nine (9), the greatest common factor of half the number of the poles of the rotor 11 (i.e., 12/2=6) and the number of the poles of the stator 14 (i.e., 9) will be three (3). This means that three combinations each of which is made up of four of the poles of the rotor 11 and three of the poles of the stator 14 are arranged. The voltages induced by the poles of the stator 14 in each of the combinations are identical in phase with each other. Consequently, motors in which a rotor has twelve (12) poles, and a stator has nine (9) poles may be viewed as being equivalent to motors in which a rotor has four (4) poles (i.e., 12 divided by 3 that is the greatest common factor of 6 (=12/2) and 9, and a stator has three (3) poles (i.e., 9 divided by 3).

Specifically, the number of minimum combinations of the induced voltages which are out of phase with each other may be expressed by M/Y. When the number of the induced voltages which are out of phase with each other is an integral multiple of three (3), it will permit vector sums which are shifted in phase by 120° and identical in magnitude to be derived and enables production of vector-balanced structures of motors.

For instance, the distribution factor when the number of the out-of-phase induced voltage vectors is three (3) will be 1. The distribution factor when the number of the out-of-phase induced voltage vectors is six (6) will be 0.866. The distribution factor when the number of the out-of-phase induced voltage vectors is nine (9) will be 0.844. The distribution factor when the number of the out-of-phase induced voltage vectors is twelve (12) will be 0.837. Specifically, the distribution factor decreases as an increase in the number of the out-of-phase induced voltage vectors. The rate of such a decrease is moderate. Increasing of the number of the out-of-phase induced voltage vectors will not be objectionable.

For instance, combinations of the number of the poles of the rotor 11 and the number of the poles of the stator 14 and distribution factors when the poles of the stator 14 are located at irregular intervals away from each other so as to meet conditions in which the unit voltages that are, as described above, rates of changes in rotation angles of magnetic fluxes flowing through three phase groups of the poles of the stator 14 are substantially identical in waveform and amplitude and shifted in phase by 360°/N, as expressed by an electrical angle, will be listed blow.

TABLE 1

|    | 3     | 6     | 9     | 12    | 15    | 18    | 21    | 24    | 27    | 30 |
|----|-------|-------|-------|-------|-------|-------|-------|-------|-------|----|
| 2  | —     |       |       |       |       |       |       |       |       |    |
| 4  | 1.000 | —     |       |       |       |       |       |       |       |    |
| 6  |       |       | —     |       |       |       |       |       |       |    |
| 8  | 1.000 | 1.000 | 0.844 | —     |       |       |       |       |       |    |
| 10 | 1.000 | 0.866 | 0.844 | 0.837 | —     |       |       |       |       |    |
| 12 |       |       | 1.000 |       |       | —     |       |       |       |    |
| 14 | 1.000 | 0.866 | 0.844 | 0.837 | 0.833 | 0.831 | —     |       |       |    |
| 16 | 1.000 | 1.000 | 0.844 | 1.000 | 0.833 | 0.844 | 0.830 | —     |       |    |
| 18 |       |       |       |       |       |       |       |       | —     |    |
| 20 | 1.000 | 1.000 | 0.844 | 0.866 | 1.000 | 0.844 | 0.830 | 0.837 | 0.829 | —  |

The table 1 refers to, as an example, combinations of the twenty poles of the rotor 11 and the thirty poles of the stator 14, but however, further combinations may be available in the above conditions.

Ones of the combinations listed in table 1 whose distribution factors are not specified are combinations which do not meet the conditions in which the number of the poles of the rotor 11 and the number of the poles of the stator 14 are so selected that the unit voltages that are the rates of changes in rotation angles of magnetic fluxes flowing through the three phase groups of the poles of the stator 14 are substantially identical in waveform and amplitude and shifted in phase by 360°/N, as expressed by an electrical angle. Such combinations do not ensure a desired induced voltage vector-balanced structure of the motor, but enable the motor to be rotated in operation.

How to assign the poles of the stator 14 to the phases under the condition of M<P/2×N will be described below taking an example in which the motor 150 is a three-phase motor equipped with the eight poles of the rotor 11. The three phases will be referred to as a U-phase, a V-phase, and a W-phase below.

In the case where the number of the poles of the stator 14 is twelve (12), and the poles of the stator 14 are assigned, in sequence, to the U-phase, the V-phase, the W-phase, the U-phase, the V-phase, the W-phase, the U-phase, the V-phase, the W-phase, the U-phase, the V-phase, and the W-phase from a selected one of the poles, all voltages induced by the poles of the same phase will be identical in phase angle with each other and maximized, thus maximizing the torque to be outputted by the motor 150.

Figure 20:
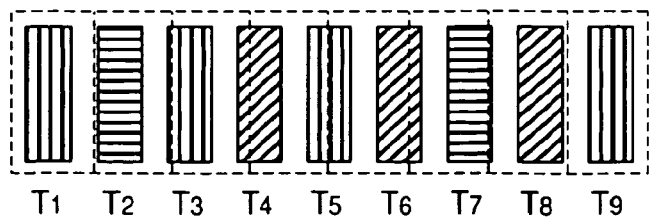
FIG. 20 is a development which shows stator magnetic poles in an ac motor according to the invention.
Figure 21:
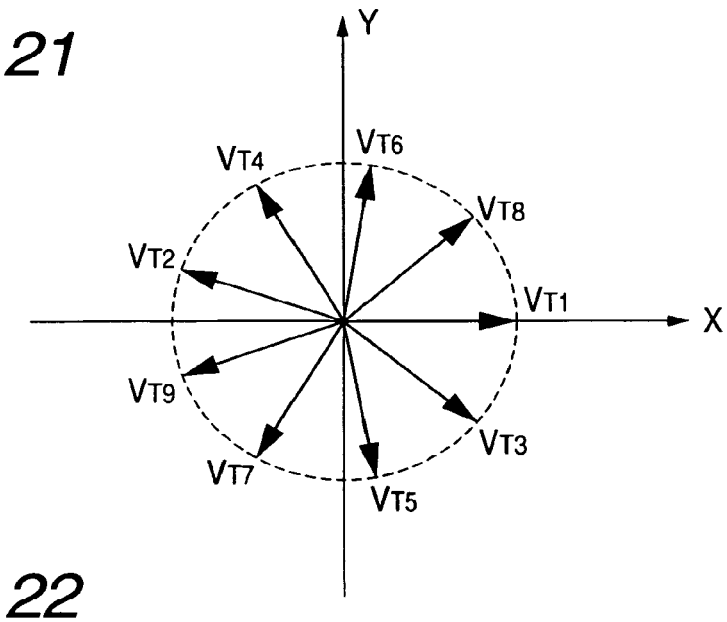
FIG. 21 is a vector diagram which shows vectors of voltages induced by stator magnetic poles.

An example where the number of the poles of the stator 14 is nine (9) which is less than twelve (12) will be described below. Here, the poles of the stator 14 are, as illustrated in FIG. 20, represented by $T_1$, $T_2$, $T_3$, $T_4$, $T_5$, $T_6$, $T_7$, $T_8$, and $T_9$. Voltages induced by the poles $T_1$ to $T_9$ are represented by $V_{T1}$, $V_{T2}$, $V_{T3}$, $V_{T4}$, $V_{T5}$, $V_{T6}$, $V_{T7}$, $V_{T8}$, and $V_{T9}$. The voltages $V_{T1}$ to $V_{T9}$ are, as expressed by vectors in FIG. 21, shifted in phase by 40°. If the phase of the induced voltage $V_{T1}$ is defined as 0°, those of the induced voltages $V_{T2}$, $V_{T3}$, $V_{T4}$, $V_{T5}$, $V_{T6}$, $V_{T7}$, $V_{T8}$, and $V_{T9}$ will be 160°, 320°, 480° (=120°), 640° (=280°), 800° (=80°), 960° (=240°), 1120° (=40°), and 1280° (=200°).

There may be made many combinations of the nine poles of the stator 14 and the U-, V-, and W-phases, but however, some of them in which phase differences between in-phase ones of the induced voltages $V_{T1}$ to $V_{T9}$ are as smaller as possible are preferable because it is possible for such combinations to increase the vector sum of in-phase ones of the induced voltages $V_{T1}$ to $V_{T9}$.

For example, the poles $T_1$, $T_4$, and $T_7$ of the stator 14 which are located in the phases of the induced voltages $V_{T1}$, $V_{T4}$, and $V_{T7}$ thereof at 0°, 120°, and 240° are defined as reference poles. Ones of the poles $T_1$ to $T_9$ which are an electrical angle of $(360 \times K \pm 60)°$ away from each of the reference poles $T_1$, $T_4$, and $T_7$ are collected into a group of the same phase. Note that K is an integer number. Specifically, the poles $T_1$, $T_3$, and $T_8$ closer to 0° are collected into a U-phase group. The poles $T_2$, $T_4$, and $T_6$ closer to 120° are collected into a V-phase group. The poles $T_5$, $T_7$, and $T_9$ closer to 240° are collected into a W-phase group. This causes the phases of the poles $T_1$ to $T_9$ to be arranged in the order of U, V, U, V, W, V, W, U, and W.

Figure 22:
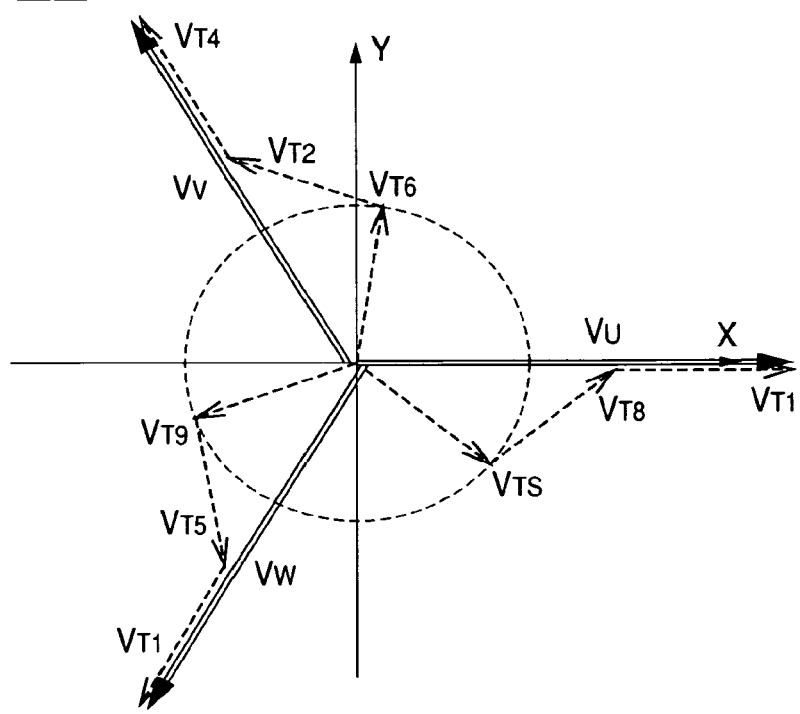
FIG. 22 is a vector diagram which shows a relation between vectors of voltages induced by the stator magnetic poles in FIG. 21 and vector sums thereof.

The magnitudes of the induced voltages Vu, Vv, and Vw of the U-, V-, and W-phases are illustrated in FIG. 22. For instance, the induced voltage Vu of the U-phase is given by a relation of Vu=Wu×Eu×(cos(0°)+cos(−40°)+cos(40°))×S1=2.532×Eu×S1. When the induced voltages of the same phase group of the poles are identical in phase difference with each other, each of the induced voltages Vu, Vv, and Vw will be 3×Eu×S1. The phase differences between the induced voltages of the same phase group of the poles result in production of voltage of 2.532/3=0.844. This ratio is commonly referred to as the distribution factor, as described above.

The winding factor that is one of factors in the torque-producing efficiency of the motor is expressed by the product of the distribution factor and the short-pitch factor. It is advisable that the value of the winding factor be as closer to one (1) as possible. The short-pitch factor depends upon the width of the poles of the stator 14. Increasing of the short-pitch factor is achieved by bringing it as close to the width of the magnets 12 of the rotor 11 as possible within a range where the leakage of flux between the poles of the stator 14 is small. Specifically, it may be achieved in the structure of the motor 150 of the invention by increasing the air gaps between the poles of the stator 14. It is necessary for actual design of the motor 150 to consider a balance between the short-pitch factor and the leakage of flux between the poles of the stator 14. A desired width of the poles of the stator 14 is also dependent upon a variety of factors. An optimum value of the short-pitch factor is, therefore, not referred to herein. The improvement of only the distribution factor will be described below.

The layout of the phases of the poles of the stator 14 selected not to meet the condition in which the poles of the stator 14 located an electrical angle of $(360 \times K \pm 60)°$ away from the reference poles are collected into a same phase group will next be studied. For instance, when the poles of the stator 14 are arrayed in the order of U, W, W, V, U, U, W, V, and V, it will cause the phase angles of the voltages induced in the same phase group to be shifted in units of 80°. Taking an example of the U-phase group, the induced voltage Vu is given by a relation of Vu=Wu×Eu×(cos(0°)+cos(−80°)+cos (80°))×S1=1.347×Eu×S1. The distribution factor will be as low as 0.499.

As apparent from the above discussion, the distribution factor may be maximized by assigning the poles of the stator 14 located an electrical angle of (360×K±60)° away from a selected one of the poles to the same phase group. This minimizes a drop in torque to be outputted by the motor 150 which arises from the phase differences between the induced voltages.

The layout of the poles of the stator 14 disposed at equi-intervals away from each other in a direction of rotation of the rotor 11 has been discussed so far. The poles of the stator 14 are not necessarily arrayed at equi-intervals, but may be arrayed at irregular intervals away from each other. The layout of the poles of the stator 14 located at irregular intervals, as the case may be, result in the improvement of torque-producing efficiency or induced voltage vector-unbalance of the motor 150. This will be discussed below in detail.

FIGS. 30 to 33 show one of typical electric motors. This type of motor includes stator poles arranged in a direction of rotation of a rotor and windings. The stator poles and the windings usually occupy a large amount of space in the motor. Therefore, when the stator poles are arranged at irregular intervals, it will cause volumes of spaces to be occupied by the windings to be different from each other, which result in formation of dead spaces occupied by no winding. However, the motor 150 of the invention is designed to have the structure in which the windings are not arranged adjacent to each other in the direction of rotation of the rotor 11, thus resulting in no formation of the dead space around the stator poles.

How to further improve the torque-producing efficiency of the motor 150 having the induced voltage vector-balanced structure in which the number of the poles of the rotor 11 and the number of the poles of the stator 14 are so selected that the unit voltages (e.g., Eu, Ev, and Ew) that are the rates of changes in rotation angles of magnetic fluxes flowing through the N phase groups of the poles of the stator 14 are substantially identical in waveform and amplitude and shifted in phase angle by 360°/N, as expressed by an electrical angle will be described. In the case where the number of the poles of the rotor 11 is eight (8), and the number of the poles of the stator 14 is nine (9), the induced voltages of the same phase group are, as described above, shifted in phase angle, so that the distribution factor will be 0.844. The increasing of the distribution factor in such a structure of the motor 150 to improve the torque-producing efficiency thereof is achieved by shifting the poles of the stator 14 in the direction of rotation of the rotor 11 so as to bring the phase angles of the induced voltages as close to each other as possible. It is advisable only in terms of the torque-producing efficiency of the motor 150 that the phase angles be matched with each other completely.

Figure 23:
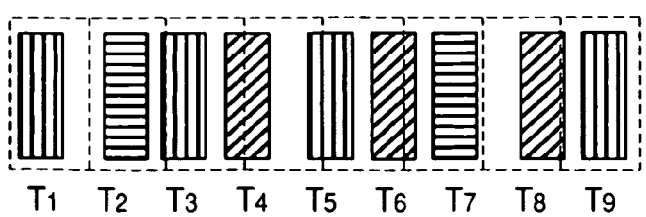
FIG. 23 is a development which shows a second modified layout of stator magnetic poles in an ac motor according to the invention.
Figure 24:
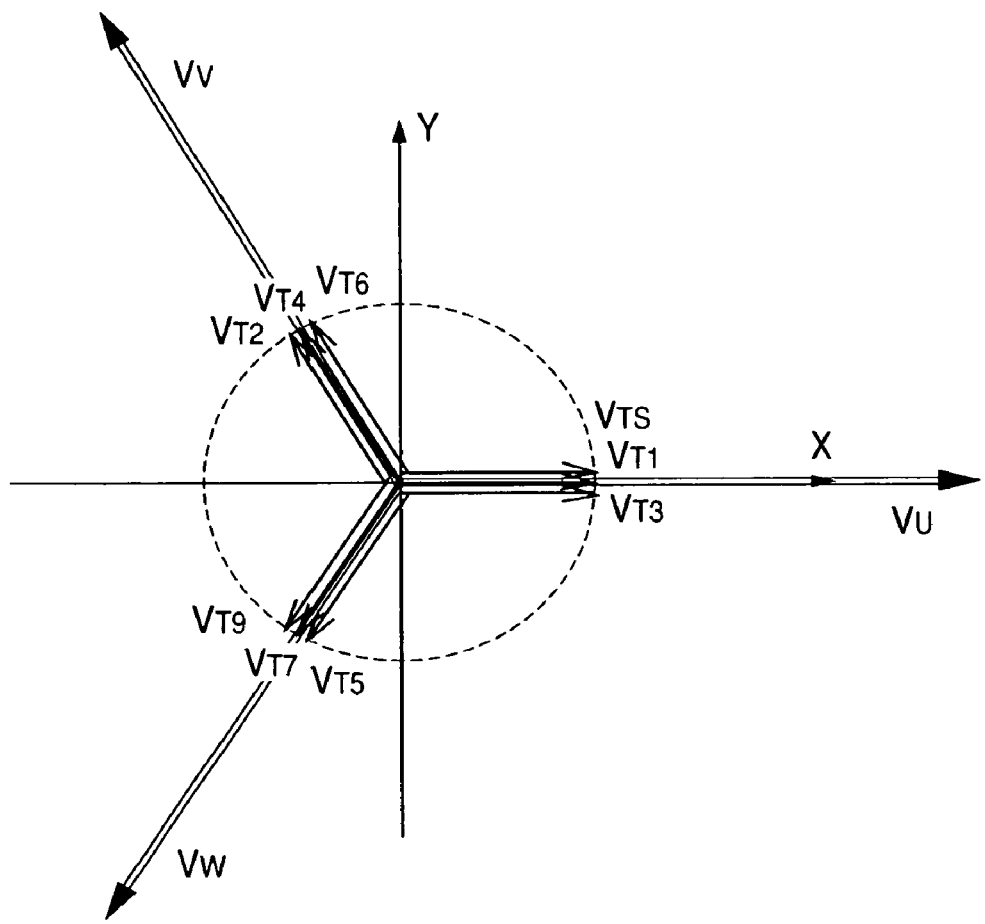
FIG. 24 is a vector diagram which shows a relation between vectors of voltages induced by the stator magnetic poles in FIG. 23 and vector sums thereof.

In the case where the number of the poles of the rotor 11 is eight (8), and the number of the poles of the stator 14 is nine (9), and the poles of the stator 14 are arranged at equi-intervals, the intervals between the poles of the stator 14 will be 40°. When intervals, as illustrated in FIG. 23, between the poles $T_1$ and $T_2$, between the poles $T_4$ and $T_5$, and between the poles $T_7$ and $T_8$ are set to 60°, intervals between the poles $T_2$ and $T_3$, between the poles $T_3$ and $T_4$, between the poles $T_5$ and $T_6$, between the poles $T_6$ and $T_7$, between the poles $T_8$ and $T_9$, and between the poles $T_9$ and $T_1$ are set to 30°, it will cause, as illustrated in FIG. 24, phase angles of the induced voltages in the same phase group to coincide with each other, so that the distribution factor will be one (1), thus improving the efficiency of the motor 150.

When the intervals between the poles $T_1$ and $T_2$, between the poles $T_4$ and $T_5$, and between the poles $T_7$ and $T_8$ are set to 50°, and the intervals between the poles $T_2$ and $T_3$, between the poles $T_3$ and $T_4$, between the poles $T_5$ and $T_6$, between the poles $T_6$ and $T_7$, between the poles $T_8$ and $T_9$, and between the poles $T_9$ and $T_1$ are set to 35°, it will cause the phase angles of the induced voltages in the same phase group not to coincide with each other completely, but the distribution factor will be 0.960 which results in improved torque-producing efficiency of the motor 150 as compared with when the poles $T_1$ to $T_2$ are arranged at equi-intervals. Such layout causes all the poles $T_1$ to $T_9$ of the stator 14 to be placed out of alignment with the poles of the rotor 11 in the radius direction of the stator 14, thus resulting in improved torque-producing efficiency of the motor 150 without increasing the cogging torque.

Figure 25:
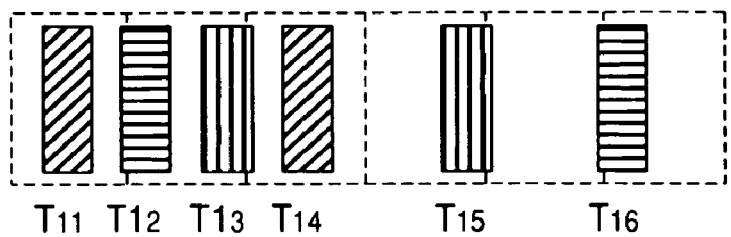
FIG. 25 is a development which shows a third modified layout of stator magnetic poles in an ac motor according to the invention.
Figure 26:
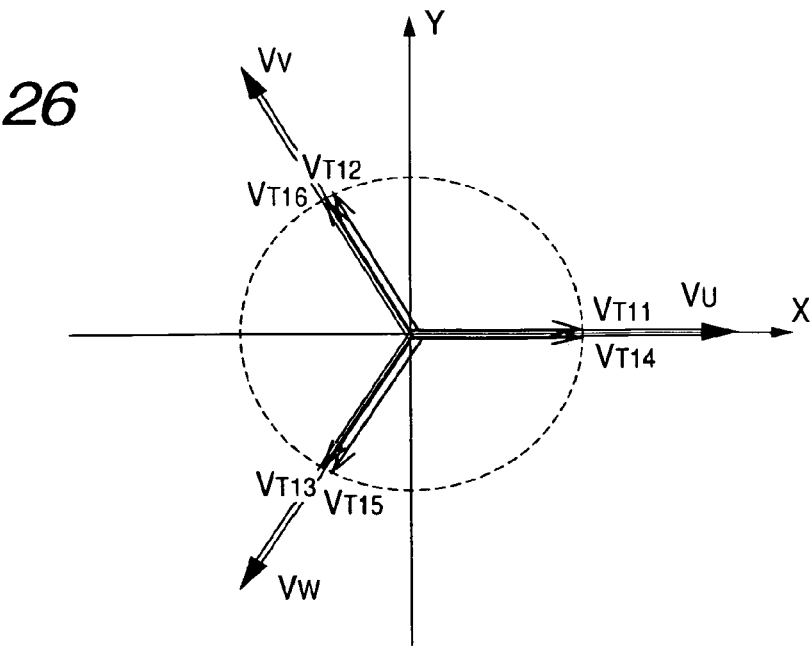
FIG. 26 is a vector diagram which shows a relation between vectors of voltages induced by the stator magnetic poles in FIG. 25 and vector sums thereof.

The effects of induced voltage vector-unbalanced combinations of the number of the poles of the rotor 11 and the number of the poles of the stator 14 which are arranged at equi-intervals will be described. For instance, in an example in which the number of the poles of the rotor 11 and the number of the poles of the stator 14 are both six (6), and the poles of the stator 14 are arrayed at equi-intervals, vectors of the voltages induced by the poles of the stator 14 are collected on two vector which are 180° out of phase with each other. Thus, when the motor 150 is operated with the three phases, it will result in the induced voltage vector-unbalance. This is avoided by, for example, the structure illustrated in FIG. 25. The stator 14 has the poles $T_{11}$, $T_{12}$, $T_{13}$, $T_{14}$, $T_{15}$, and $T_{16}$ to which the phases U, W, V, W, U, and V are assigned. Intervals between the poles $T_{11}$ and $T_{12}$, between the poles $T_{12}$ and $T_{13}$, and between the poles $T_{16}$ and $T_{11}$ are set to 80°. Intervals between the poles $T_{13}$ and $T_{14}$, between the poles $T_{14}$ and $T_{15}$, and between the poles $T_{15}$ and $T_{16}$, are set to 40°. This layout of the poles $T_{11}$ to $T_{16}$ will cause, as illustrated in FIG. 26, vectors of induced voltages Vu, Vv, and Vw of the U-, V- and W-phase groups to be equal in magnitude to each other and phase differences therebetween to be 120°, thereby eliminating the induced voltage vector-unbalance and resulting in reductions in the cogging torque and torque ripple.

Figure 27:
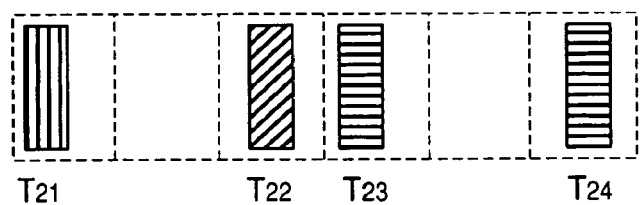
FIG. 27 is a development which shows a fourth modified layout of stator magnetic poles in an ac motor according to the invention.
Figure 28:
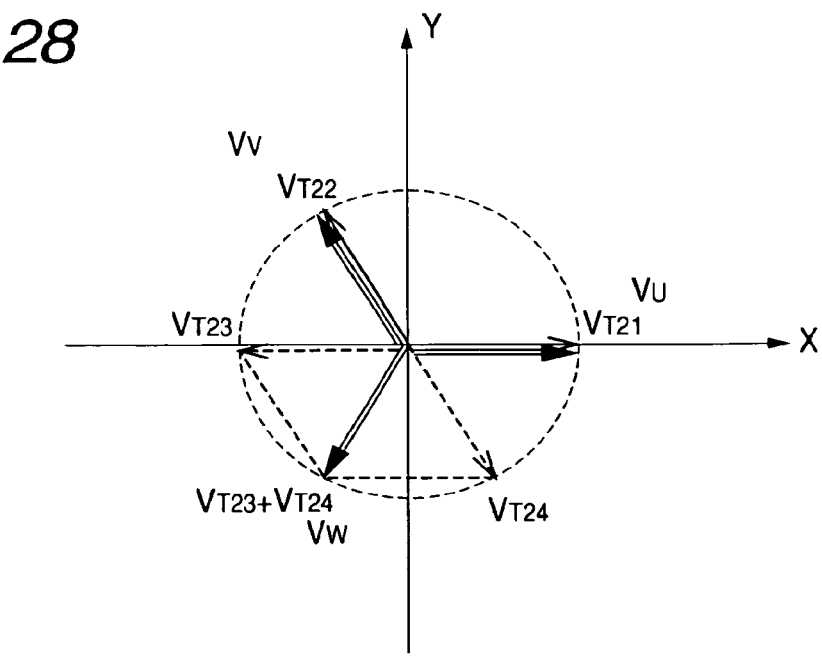
FIG. 28 is a vector diagram which shows a relation between vectors of voltages induced by the stator magnetic poles in FIG. 27 and vector sums thereof.

The above beneficial advantages may also be derived by the structure of the motor 150 in which the number of the poles of the rotor 11, and the number of the poles of the stator 14 which is not an integral multiple of the number of the phase groups. For example, as illustrated in FIG. 27, the stator 14 has the poles $T_{21}$, $T_{22}$, $T_{23}$, and $T_{24}$ to which the phases U, V, W, and W are assigned. Intervals between the poles $T_{21}$ and $T_{22}$ and between the poles $T_{23}$ and $T_{24}$ are set to 160°. Intervals between the poles $T_{22}$ and $T_{23}$ and between the poles $T_{24}$ and $T_{21}$ are set to 20°. This layout of the poles $T_{21}$ to $T_{24}$ will cause, as illustrated in FIG. 27, vectors of the induced voltages Vu, Vv, and Vw of the U-, V- and W-phase groups to be equal in magnitude to each other and phase differences therebetween to be 120°, thereby eliminating the induced voltage vector-unbalance and resulting in reductions in the cogging torque and torque ripple.

As apparent from the above, the motor 150 of this invention may be designed to have any one of a variety of combinations of the poles of the rotor 11 and the poles of the stator 14 which are arrayed at irregular intervals in order to improve the torque-producing efficiency and reduce the cogging torque or torque ripples. The sizes of intervals between the poles of the stator 14 are preferably selected in terms of the width of the air gaps between adjacent two of the poles of the stator 14 and the effects on the cogging torque or torque ripples.

When it is difficult to arrange the poles of the stator 14 at irregular intervals or to ensure a desired degree of the above effects, the poles of the stator 14 may alternatively be made to have different widths. Of course, the poles of the stator 14 may also be produced to have different widths and arranged at irregular intervals.

Figure 29:
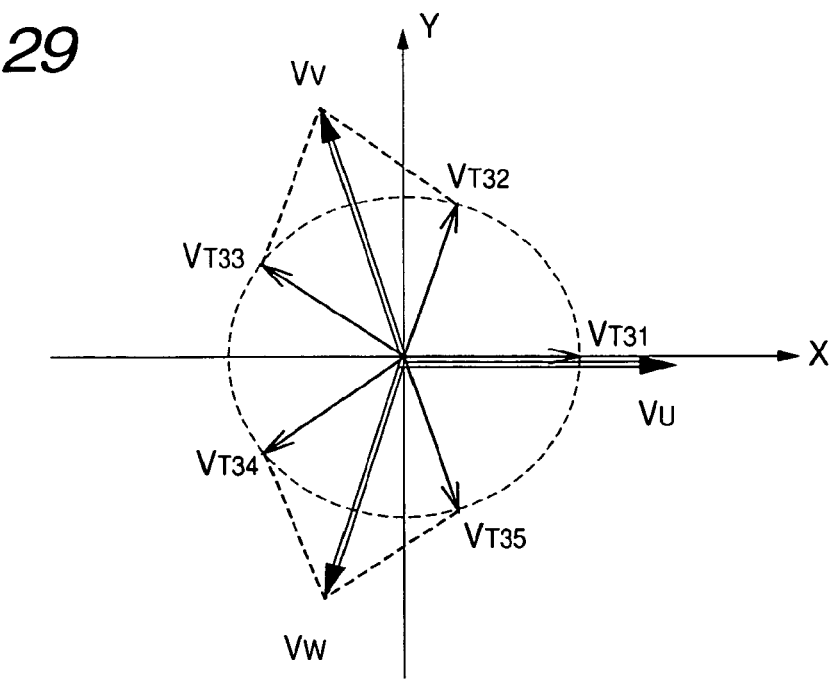
FIG. 29 is a vector diagram which shows a relation between vectors of voltages induced by stator magnetic poles and vector sums thereof.

For instance, when the motor 150 is designed to have twelve (12) poles of the rotor 11 and fifteen (15) poles of the stator 14 which are arranged at regular intervals, it will cause the poles of the stator 14 to induce five voltages $V_{T31}$, $V_{T32}$, $V_{T33}$, $V_{T34}$, and $V_{T35}$, as illustrated in FIG. 29, whose vectors are shifted from each other in units of 72°. If two pairs each of which includes adjacent two of the induced voltage vectors are defined as the V- and W-phases, respectively, and a remaining one of the induced voltage vector is defined as the U-phase, each of sums (i.e., vectors of the voltages Vv and Vw) of the induced voltage vectors of the V- and W-phases will be 1.6 times the induced voltage vector of the U-phase (i.e., a vector of voltage $V_{T31}$). A balance among the induced voltage vectors of the U-, V-, and W-phases may be achieved by forming the pole of the stator 14 of the U-phase to have a greater width to increase the amount of magnetic flux flowing therethrough or alternatively forming the poles of the stator 14 of the V- and W-phase to have smaller widths to decrease the amount of magnetic flux flowing therethrough. The phase differences between the induced voltage vectors (i.e., vectors of the voltages Vu and Vv and vectors of the voltages Vu and Vw) of the U- and V-phases and between U- and W-phases are both 108°. The phase difference between the induced voltage vectors of the V- and W-phases is 144°. 108° and 144° are not 120°, but close to it within an allowable range, thus ensuring a permissible induced voltage vector-balance.

The balance among the induced voltage vectors of the U-, V-, and W-phases may also be achieved by changing the numbers of turns of windings (e.g., the windings 15, 16, 17, and 18) of the stator 14 on a phase-basis. Of course, it may be accomplished in combination with arrangement of the poles of the stator 14 at irregular intervals and/or formation thereof to have different widths.

For instance, when the motor 150 is designed to have twelve (12) poles of the rotor 11 and fifteen (15) poles of the stator 14 which are arranged at regular intervals, it will cause, as described above, the poles of the stator 14 to induce five voltages whose vectors are shifted from each other in units of 72°. If two pairs each of which includes adjacent two of the induced voltage vectors are defined as the V- and W-phases, respectively, and a remaining one of the induced voltage vector is defined as the U-phase, each of sums of the induced voltage vectors of the V- and W-phases will be 1.6 times the induced voltage vector of the U-phase. The balance among the induced voltage vectors of the U-, V-, and W-phases may be achieved by increasing the number of turns of the winding of the U-phase 1.6 times those of the V- and W-phases. The phase differences between the induced voltage vectors of the U- and V-phases and between U- and W-phases are both 108°. The phase difference between the induced voltage vectors of the V- and W-phases is 144°. 108° and 144° are not 120°, but close to it within an allowable range, thus ensuring a permissible induced voltage vector-balance.

The motor 150 of the invention is designed to minimize the leakage of magnetic flux between the poles of the stator 14 and/or avoid a short between the magnetic circuits. It is advisable that the techniques, as described above, be combined in terms of the size of the motor 150, the number of the poles of the rotor 11 or the stator 14, the purpose of use of the motor 150, and/or other motor constraints.

While the present invention has been disclosed in terms of the preferred embodiments in order to facilitate better understanding thereof, it should be appreciated that the invention can be embodied in various ways without departing from the principle of the invention. Therefore, the invention should be understood to include all possible embodiments and modifications to the shown embodiments witch can be embodied without departing from the principle of the invention as set forth in the appended claims.

What is claimed is:

1. An ac motor comprising:
a rotor having rotor magnetic poles which are N-poles and S-poles arranged alternately along a circumference thereof;
a stator having N stator pole groups made up of magnetic poles arranged along a circumference thereof, the N stator pole groups being shifted in a circumferential direction of said stator relatively from a preselected reference one of the rotor magnetic poles by different angles, respectively, on a pole basis; and
a plurality of looped windings each of which extends in a circumferential direction of said stator, the looped windings being disposed adjacent each other in an axial direction of said stator in relation to the N stator pole groups, respectively,
wherein a number P of the rotor magnetic poles and a number M of the magnetic poles of said stator are selected to meet a relation of M<(P/2)×N.

2. An ac motor as set forth in claim 1, wherein the number P of the rotor magnetic poles and the number M of the magnetic poles of said stator are selected so as to meet conditions in which unit voltages that are rates of changes in rotation angles of magnetic fluxes flowing through the N stator pole groups are substantially identical in waveform and amplitude and shifted in phase angle by 360°/N, as expressed by an electrical angle.

3. An ac motor as set forth in claim 1, wherein the magnetic poles of said stator are arranged at irregular intervals away from each other so as to meet conditions in which unit voltages that are rates of changes in rotation angles of magnetic fluxes flowing through the N stator pole groups are substantially identical in waveform and amplitude and shifted in phase angle by 360°/N, as expressed by an electrical angle.

4. An ac motor as set forth in claim 1, wherein at least one of widths of the magnetic poles of said stator is selected to be different from the other or others of the widths of the magnetic poles of said stator so as to meet conditions in which unit voltages that are rates of changes in rotation angles of magnetic fluxes flowing through the N stator pole groups are substantially identical in waveform and amplitude and shifted in phase angle by 360°/N, as expressed by an electrical angle.

5. An ac motor as set forth in claim 1, wherein a number of turns of at least one of said plurality of looped windings is selected to be different from that of the other or others of said plurality of looped windings so as to meet conditions in which voltages, as induced in the N stator pole groups, respectively, which are given by products of unit voltages that are rates of changes in rotation angles of magnetic fluxes flowing through the N stator pole groups and a number of turns of looped windings of the N stator pole groups, are substantially identical in waveform and amplitude and shifted in phase angle by 360°/N, as expressed by an electrical angle.

* * * * *